(12) United States Patent
Hecker et al.

(10) Patent No.: US 6,327,903 B1
(45) Date of Patent: Dec. 11, 2001

(54) DEVICE FOR DETECTING THE MEASURED QUANTITIES OF A DRIVE VEHICLE AND/OR THE MEASURED QUANTITIES OF A TRAILER OR SEMITRAILER MECHANICALLY LINKED TO A DRIVE VEHICLE, IN PARTICULAR A TRAILER OR SEMITRAILER

(75) Inventors: Falk Hecker, Markgroeningen; Oliver Jundt, Besigheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/351,484

(22) Filed: Jul. 13, 1999

(30) Foreign Application Priority Data

Jul. 13, 1998 (DE) .............................. 198 31 286

(51) Int. Cl.$^7$ .................................. G08B 21/00
(52) U.S. Cl. .............................................. 73/129
(58) Field of Search ........................ 73/121, 128, 129, 73/862.57; 303/123; 340/453, 438, 431

(56) References Cited

U.S. PATENT DOCUMENTS

| 4,060,284 | * | 11/1977 | Steiner | 303/123 |
|---|---|---|---|---|
| 4,319,766 | * | 3/1982 | Corteg et al. | 73/862.57 |
| 5,090,779 | * | 2/1992 | Kramer | 303/123 |
| 5,132,664 | * | 7/1992 | Feldmann et al. | 340/453 |
| 5,677,667 | * | 10/1997 | Lesesky et al. | 340/431 |

FOREIGN PATENT DOCUMENTS

| 776296 | * | 1/1968 | (CA) . |
| 39 23 677 | | 8/1991 | (DE) . |
| 41 14 921 | | 6/1993 | (DE) . |
| 196 02 879 | | 8/1997 | (DE) . |

\* cited by examiner

*Primary Examiner*—Robert Raevis

(57) ABSTRACT

A device for detecting measured quantities of a drive vehicle, in particular of a tractor, and/or measured quantities of a trailer or semitrailer operatively connected to the drive vehicle. In addition to a coupling device for transmission of force between the drive vehicle and the trailer or semitrailer, at least one connecting device is present. At least one first detection arrangement for detecting a measured quantity of the drive vehicle and/or at least one second detection arrangement for detecting a measured quantity of the trailer or semitrailer is inserted in the connecting device.

35 Claims, 1 Drawing Sheet

DEVICE FOR DETECTING THE MEASURED QUANTITIES OF A DRIVE VEHICLE AND/ OR THE MEASURED QUANTITIES OF A TRAILER OR SEMITRAILER MECHANICALLY LINKED TO A DRIVE VEHICLE, IN PARTICULAR A TRAILER OR SEMITRAILER

BACKGROUND INFORMATION

German Patent No. 39 23 677 describes an angle sensor for detecting the angle formed by the longitudinal axes of a tractor and a trailer or semitrailer. This angle sensor is equipped with a potentiometer arranged on the drive vehicle or tractor, whose actuating shaft can be coupled to the trailer. The problem in measuring the angle between the trailer and the tractor with such a conventional potentiometer sensor is that this sensor must be attached to both the tractor and the trailer or semitrailer, and must be detached/re-attached each time the tractor is unhitched from/hitched to the trailer or semitrailer, and a corresponding recorder must be present on the trailer or semitrailer which necessitates that both the tractor and the trailer or semitrailer be modified for the angle sensor to be installed. Therefore this method is inconvenient and not very practical.

German Patent No. 41 14 921 describes a data storage device integrated in an electric plug having a plurality of pins for a device, which is connected to pins that are separate from those transmitting the signals, and in which characteristic data of the device and the transmitted signals are stored.

German Patent No. 196 02 879 shows a method of detecting the hazard of a vehicle overturning. For this purpose, a low-intensity braking action compared to the maximum possible braking force is initiated when the transverse acceleration exceeds a specific threshold value. This braking action is used to determine whether the wheels of the vehicle are lifted off the ground. If the wheels are lifted off the ground, the ABS system, in particular that of the trailer, steps in. For this reason, the response of the ABS system is monitored. The current supply is measured at the plug of the tractor or on the ABS valve for monitoring purposes. To perform this measurement, a current measuring instrument is connected to the trailer ABS. The disadvantage of this method is that the current measuring instrument is connected to the trailer ABS. However, this means that older existing trailers, which at present are not so equipped, must be retrofitted, resulting in extra costs to the end user. German Patent No. 196 02 879 contains no indication for integrating the instrument in the plug of the tractor, which would result in that only already existing tractors would have to be retrofitted.

An object of the present invention is to provide a device for detecting measured quantities of a drive vehicle, in particular a tractor, and/or measured quantities of a trailer or semitrailer, which results in no additional or excessive retrofitting costs to the end user for the sensors used. In particular, no additional retrofitting costs should arise with regard to the trailer or semitrailer. Furthermore, all trailers and semitrailers, in particular those having ABS systems installed, should be able to utilize this additional option provided by these sensors.

SUMMARY OF THE INVENTION

The device according to the present invention is a device for detecting measured quantities of a drive vehicle, in particular a tractor, and/or measured quantities of a trailer or semitrailer operatively connected to the drive vehicle. In addition to a hitching device for transmission of force between a drive vehicle and a trailer or semitrailer, at least one connecting device must be available.

This connecting device advantageously includes, as a minimum, a connecting cable or a connecting line. Since a vehicle combination made up of a drive vehicle, i.e., a tractor, and a trailer or semitrailer usually has a connecting cable or connecting lines, no additional connecting devices are needed, i.e., the connecting devices already present in the vehicle combination can be used.

Based on the connecting cables already present in a vehicle combination, different options are available. The connecting cable may advantageously be a connecting cable

- for supplying the trailer or semitrailer-side lighting system with power from the drive vehicle;
- for supplying a trailer or semitrailer-side control device with power; in particular, this may be an ABS connecting cable;
- for connecting a drive vehicle-side control device with a trailer or semitrailer-side control device; in particular, data may be exchanged via this connecting cable.

The connecting line may be a connecting line for transporting braking medium into the trailer or semitrailer-side brake system. The braking medium is transported via this connecting line to the trailer or semitrailer-side brake system for pre-storage or control.

The connecting device has at least on the trailer or semitrailer side a mounting device for mounting on the trailer or semitrailer, with which the connecting device can be reproducibly mounted on the trailer or semitrailer. This means that the connecting device is always mounted at the same location on the trailer or semitrailer, i.e., it always assumes the same position with respect to the trailer or semitrailer. For this purpose advantageously there is only one way to mount the device on the trailer or semitrailer. This is achieved, for example, by designing the mounting device with a projection or recess. This provides only one possible way to introduce the mounting device in the respective mating piece on the trailer or semitrailer. The trailer- or semitrailer-side mounting device is designed as a plug or a socket or coupling.

The connecting device also has on the trailer or semitrailer side a mounting device to mount the connecting device onto the drive vehicle. Like in the case of the trailer- or semitrailer-side mounting device, mounting on the drive vehicle is reproducible using the drive vehicle side mounting device. Also in this case, only one possibility should be available for mounting with respect to the drive vehicle. Like in the case of the trailer- or semitrailer-side mounting device, the drive vehicle side mounting device is also designed as a plug or a socket or coupling.

If a vehicle combination made up of a drive vehicle and a trailer or semitrailer is to be stabilized using an appropriate control mechanism, normally the measured quantities of both the drive vehicle and the trailer or semitrailer must be determined for this purpose. As an example for such a control, reference is made to the control mechanism described in SAE Paper 973284 "Vehicle Dynamics Control for Commercial Vehicles."

For an owner not to have to retrofit an existing trailer or semitrailer, according to the present invention at least one detection means for detecting a measured quantity of the trailer or semitrailer is inserted in the connecting device. For the same reason, at least one detection means for detecting a measured quantity of the drive vehicle is advantageously inserted in the connecting device. This advantage concerning retrofitting costs is very important in view of the considerably larger number of existing trailers and semitrailers. Hereinafter, the detection means for detecting a measured quantity of the drive vehicle is referred to as the first detection means, and the detection means for detecting a measured quantity of the trailer or semitrailer is referred to as the second detection means.

These measured quantities are, for the trailer or semitrailer, the quantities that describe the motion characteristics of the trailer or semitrailer, for example, the yaw rate of the trailer or semitrailer and/or the transverse acceleration acting on the trailer or semitrailer. It may also be the angle between the longitudinal axes of the drive vehicle and the trailer or semitrailer.

The second detection means is introduced in the connecting device mainly because the connecting device remains connected to the drive vehicle when the trailer or semitrailer is unhitched. This means that the connecting device remains on the drive vehicle even when a different trailer or semitrailer is used. Thus, with respect to the trailer or semitrailer, only the drive vehicle, but not the trailer or semitrailer, must be retrofitted.

For the second detection means to be capable of detecting a measured quantity of the trailer or semitrailer, it must be functionally assigned to the trailer or semitrailer. For this reason, the detection means is inserted in the trailer- or semitrailer-side mounting device. Likewise, the first detection means is functionally assigned to the drive vehicle and is therefore inserted in the drive vehicle side mounting device.

The second detection means is advantageously a sensor for detecting a quantity describing the yaw rate of the trailer or semitrailer and/or a sensor for detecting a quantity describing the transverse acceleration acting on the trailer or semitrailer, and/or a sensor for detecting the angle between the drive vehicle and the trailer or semitrailer. It is particularly advantageous if a quantity describing the angle between the drive vehicle and the trailer or semitrailer is determined as a function of at least one quantity detected for the trailer or semitrailer.

It is of particular advantage if the signals or data detected by the first or second detection means are transmitted to a controller located in the drive vehicle via a CAN bus.

For setting and adjustment purposes, it is advantageous if both the trailer- or semitrailer-side mounting device and the drive vehicle side mounting device and/or the first and second detection means inserted therein have means for horizontal adjustment of the respective detection means. This allows the alignment of the detection means to be optimized.

DETAILED DESCRIPTION

Figure 1:
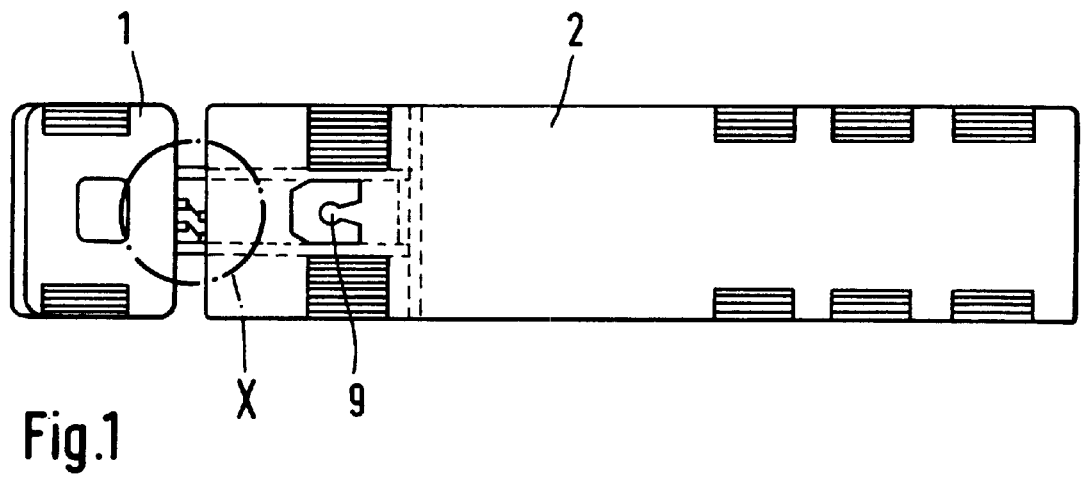
FIG. 1 shows a drive vehicle in the form of a saddle-type semitrailer tractor and a semitrailer, supported by the saddle of the drive vehicle and pulled by that drive vehicle, with the axes of both vehicles being aligned.

FIG. 1 shows a vehicle combination made up of a drive vehicle 1, i.e., a tractor, and a semitrailer 2. The illustration selected for FIG. 1 should have no limiting effect; a vehicle combination made up of a drive vehicle and a trailer, in particular, a draw bar trailer, is also conceivable. Semitrailer 2 is connected to drive vehicle 1 via a coupling device 9 for transmitting force between the drive vehicle and the semitrailer.

Figure 2:
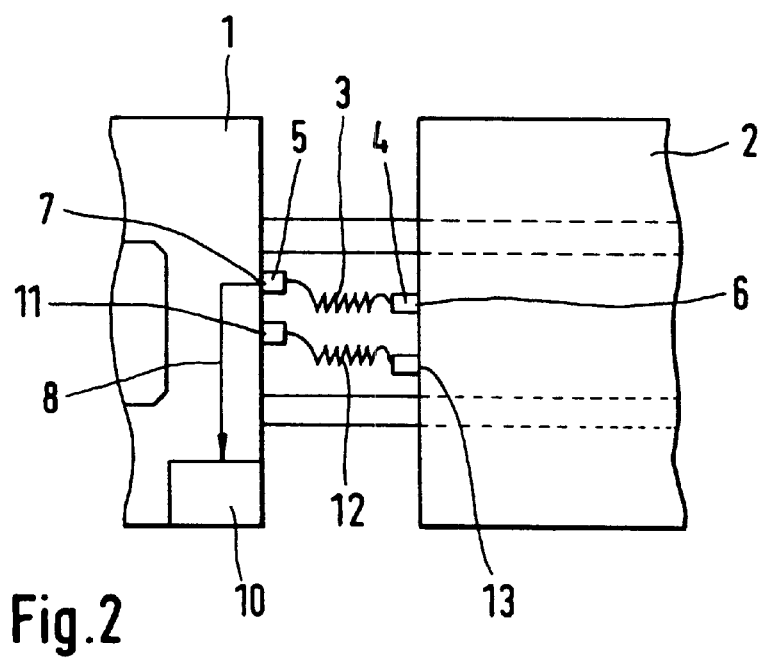
FIG. 2 shows the details within circled area X of FIG. 1, and in particular connecting devices, including components connecting the drive vehicle with the trailer or semitrailer, arranged between the drive vehicle and the semitrailer.

FIG. 2 shows the detail of area X of FIG. 1 in more detail. It is assumed that drive vehicle 1 has a control device 10. Control device 10 is a traction control device. The brake and/or drive slip of the drive vehicle is to be controlled using this traction control device. Different alternatives are conceivable to equip the semitrailer with a control device. It is also conceivable that the semitrailer has no control device. The semitrailer may also have a control device for regulating the brake slip. A possible control device for the semitrailer is not illustrated in FIG. 1 for the sake of clarity.

As an alternative, a control device as described in the aforementioned SAE paper 973284 is also conceivable for the vehicle combination. With such a control device, the vehicle combination can be dynamically stabilized not only in the longitudinal direction, but also in the transverse direction of the vehicles. For example, such a control device may influence the angle between the drive vehicle and the trailer or semitrailer for the purpose of stabilization. The angle represents the deviation of the two longitudinal axes, i.e., the deviation of the longitudinal axis of the drive vehicle from that of the trailer or semitrailer.

The brake system with which the vehicle combination made up of the drive vehicle and the trailer or semitrailer is equipped is not illustrated in either FIG. 1 or FIG. 2. It should be pointed out here, however, that this brake system may be a pneumatic, electro-pneumatic, or electromechanical brake system. A hydraulic or electro-hydraulic brake system may also be used. The design and operation of these brake systems are also assumed to be known and are therefore not explained in detail. The present embodiment is based on a pneumatic brake system, which, however, should not limit the use of the device according to the present invention with other brake systems.

FIG. 2 shows two connecting devices. The first connecting device has a drive vehicle side mounting device 7, a connecting cable 4, and a trailer- or semitrailer-side mounting device 6. The second connecting device has a drive vehicle side mounting device 11, a connecting line 12, and a trailer- or semitrailer-side mounting device 13. The illustration of only two connecting devices should represent no limitation. Normally a vehicle combination has more than two connecting devices.

The connecting cable is a connecting cable through which a trailer- or semitrailer-side lighting system is supplied with power. It may also be a connecting cable through which a trailer- or semitrailer-side control device, if the trailer or semitrailer is so equipped, is supplied with power; this may, in particular, be an ABS connecting cable. The brake slip of the trailer or semitrailer wheels is controlled by the trailer- or semitrailer-side control device. The connecting cable may also be a connecting cable connecting a drive vehicle side control device with a trailer- or semitrailer-side control device if the trailer or semitrailer is so equipped. The data between the two control devices are then exchanged over this connecting cable. The drive and/or brake slip of the drive vehicle wheels are controlled by the drive vehicle side control device, and the brake slip of the trailer or semitrailer is controlled by the trailer- or semitrailer-side control device.

Since the embodiment is to be based on a pneumatic brake system, the connecting line is a connecting line for transporting a braking medium, in particular compressed air, into the trailer- or semitrailer-side brake system. In general, pneumatic brake systems have two connecting lines. One connecting line carries braking medium for storage, i.e., the braking medium transferred goes to a storage device. Another connecting line is used for transporting braking medium for control purposes, i.e., the valves belonging to the trailer or semitrailer braking system are controlled with the braking medium transferred.

Plugs and sockets or coupling may be used in the drive vehicle side mounting devices 7 and 11, and in the trailer- or semitrailer-side mounting devices 6 and 13, respectively. Sockets or couplings may also be defined as "receptacles." The following should be explained: plug is defined as a "male" connector, while socket or coupling is defined as a "female" connector. In any case, the corresponding mating piece must be available on the drive vehicle and the trailer or semitrailer for mounting the connecting device depending on the embodiment of the mounting devices of the connecting device.

According to FIG. 2, a sensor 4 is integrated in trailer or semitrailer mounting device 6, while another sensor 5 is integrated in drive vehicle side mounting device 7. Sensor 4 detects a measured quantity of the trailer or semitrailer, and sensor 5 detects a measured quantity of the drive vehicle. A CAN bus 8 transmits the signals generated by sensors 4, 5 to control device 10, located in drive vehicle 1, which is provided for analyzing the sensor signals, among other things. CAN bus 8 should also run in connecting cable 3. Connecting line 12 is not illustrated in FIG. 2.

The insertion of the sensor equipment into the mounting devices that are assigned to connecting cable 3 should represent no limitation. The sensor equipment may also be inserted in the mounting devices assigned to connecting line 12, or it may also be divided between the mounting devices of the connecting line and the connecting cable.

Both the drive vehicle side and the trailer- or semitrailer-side mounting devices are designed so that the respective connecting devices are reproducibly mounted on the trailer or semitrailer and the drive vehicle. This means that the connecting device is always mounted in the same place on the trailer or semitrailer and the drive vehicle, i.e., assumes the same position with respect to the trailer or semitrailer and the drive vehicle. Therefore there is only one way to mount the device with respect to both trailer or semitrailer and drive vehicle.

Both trailer- or semitrailer-side mounting devices 6, 13 and drive vehicle side mounting devices 7, 11 and sensors 4, 5 inserted therein may have means (not shown in FIG. 2) for horizontally aligning the respective detection means, i.e., sensors.

Sensor 4 may be a sensor for detecting a quantity describing the yaw rate of the trailer or semitrailer and/or a sensor for detecting a quantity describing the transverse acceleration acting on the trailer or semitrailer and/or a sensor for detecting a quantity describing the angle between the drive vehicle and the trailer or semitrailer. Concerning the quantity describing the angle it should be pointed out that the following alternative is also conceivable: The angle between drive vehicle and trailer or semitrailer is determined in control device 10 as a function of at least one quantity detected for the trailer or semitrailer.

Detection means or sensor 5 detects a measured quantity of the drive vehicle that describes the motion characteristics of the drive vehicle.

According to a special embodiment, connecting cable 3 is designed as an ABS connecting cable under ISO standard 7638. The drive vehicle side and the trailer- or semitrailer-side mounting devices are also designed according to ISO standard 7638 as plugs corresponding to this standard. Thus sensors 4, 5 can be integrated in plug 6, 7 without increasing the size of the latter. The ABS connecting cable is well suited for integrating sensors 4, 5 as proposed according to the present invention, since this cable 3 remains on the drive vehicle or tractor 1, the respective trailer- or semitrailer-side plug is relatively large, and is attached to the receptacle of trailer or semitrailer 2 in a very stable manner via a clamping device, and the sensor signals can be transmitted to control device 10 via CAN bus 8.

In summary, the present invention offers the following advantages compared to direct mounting of the sensors on the semitrailer:

Only the drive vehicle or tractor need appropriate connecting devices. This means no additional retrofitting costs for the trailer or semitrailer are to be borne by the end user in purchasing a tractor equipped with the functions provided by the sensors according to the present invention. With the CAN bus running in the ABS cable, through which the sensor signals are transmitted, all semitrailers having a corresponding ABS receptacle (with vertical orientation) can be sensed, i.e., this additional option can be made use of with almost any trailer or semitrailer using these sensors.

The proposed integration of sensors in the trailer- or semitrailer-side mounting device is possible due to the size of the sensors that will be available in the future, e.g., combined micromechanical yaw rate sensors and acceleration sensors with no increase in the size of the mounting device.

In conclusion, it should be mentioned that the form of the embodiments selected in the description and the illustration selected for the figures should have no limiting effect.

What is claimed is:

1. A device for detecting measured quantities of at least one of a drive vehicle, a trailer operatively connected to the drive vehicle, and a semitrailer operatively connected to the drive vehicle, the device comprising:
   at least one connecting device situated between, on the one hand, the drive vehicle and, on the other hand, at least one of the trailer and the semitrailer, the at least one connecting device including at least one of: (a) at least one first detecting arrangement for detecting a first measured quantity of the drive vehicle, and (b) at least one second detecting arrangement for detecting a second measured quantity of the at least one of the trailer and the semitrailer,
   wherein the at least one connecting device includes the at least one first detecting arrangement, and the at least one first detecting arrangement directly measures the first measured quantity of the drive vehicle.

2. The device according to claim 1, wherein the drive vehicle includes a tractor.

3. The device according to claim 1, wherein the at least one connecting device includes at least one of a connecting cable and a connecting line.

4. The device according to claim 1, wherein the at least one connecting device includes a mounting device for mounting on the at least one of the trailer and the semitrailer.

5. The device according to claim 4, wherein the mounting device includes at least one of a plug, a socket and a coupling.

6. The device according to claim 4, wherein the first detection arrangement is situated in the mounting device.

7. The device according to claim 6, further comprising means, situated in the mounting device, for horizontally aligning the first detection arrangement.

8. The device according to claim 1, wherein the at least one connecting device includes a mounting device for mounting on the drive vehicle.

9. The device according to claim 8, wherein the mounting device includes at least one of a plug, a socket and a coupling.

10. The device according to claim 8, wherein the second detection arrangement is situated in the mounting device.

11. The device according to claim 10, wherein the second detection arrangement includes a sensor for detecting at least one of:
- a yaw rate of the at least one of the trailer and the semitrailer;
- a transverse acceleration acting on the at least one of the trailer and the semitrailer; and
- an angle between, on the one hand, the drive vehicle and, on the other hand, the at least one of the trailer and the semitrailer.

12. The device according to claim 10, further comprising means, situated in the mounting device, for horizontally aligning the second detection arrangement.

13. The device according to claim 1, wherein the at least one connecting device remains connected to the drive vehicle when the at least one of the trailer and the semitrailer is unhitched from the drive vehicle.

14. The device according to claim 1, further comprising:
- a CAN bus; and
- a control device situated in the drive vehicle,
- wherein at least one of the first detection arrangement and the second detection arrangement can transmit detected data via the CAN bus to the control device.

15. The device according to claim 1, wherein the at least one connecting device includes a connecting cable through which a lighting system of the at least one of the trailer and the semitrailer is supplied with power from the drive wheel.

16. The device according to claim 1, wherein the at least one connecting device includes an ABS connecting cable through which a control device of the at least one of the trailer and the semitrailer is supplied with a voltage from the drive vehicle.

17. The device according to claim 1, wherein the at least one connecting device includes a connecting cable that connects a control device of the drive vehicle to a control device of the at least one of the trailer and the semitrailer, for providing an exchange of data.

18. The device according to claim 1, wherein the at least one connecting device includes a connecting line through which a braking medium is transported, for at least one of storage and control, into the at least one of the trailer and the semitrailer.

19. The device according to claim 1, further comprising means for determining a quantity describing an angle between the drive vehicle and the at least one of the trailer and the semitrailer as a function of at least one quantity detected for the at least one of the trailer and the semitrailer.

20. The device according to claim 1, wherein the at least one connecting device is not a coupling device for transmitting a drive force between the drive vehicle and at least one of the trailer and semitrailer.

21. A device for detecting measured quantities of at least one of a drive vehicle, a trailer operatively connected to the drive vehicle, and a semitrailer operatively connected to the drive vehicle, the device comprising:
- at least one connecting device situated between, on the one hand, the drive vehicle and, on the other hand, at least one of the trailer and the semitrailer, the at least one connecting device including at least one of: (a) at least one first detecting arrangement for detecting a first measured quantity of the drive vehicle, and (b) at least one second detecting arrangement for detecting a second measured quantity of the at least one of the trailer and the semitrailer,
- wherein the at least one connecting device is adapted to be mounted only one way with respect to the at least one of the trailer and the semitrailer.

22. A device for detecting measured quantities of at least one of a drive vehicle, a trailer operatively connected to the drive vehicle, and a semitrailer operatively connected to the drive vehicle, the device comprising:
- at least one connecting device situated between, on the one hand, the drive vehicle and, on the other hand, at least one of the trailer and the semitrailer, the at least one connecting device including at least one of: (a) at least one first detecting arrangement for detecting a first measured quantity of the drive vehicle, and (b) at least one second detecting arrangement for detecting a second measured quantity of the at least one of the trailer and the semitrailer,
- wherein the at least one connecting device is adapted to be mounted only one way with respect to the drive vehicle.

23. A device for detecting measured quantities of at least one of a drive vehicle, a trailer operatively connected to the drive vehicle, and a semitrailer operatively connected to the drive vehicle, the device comprising:
- at least one connecting device situated between, on the one hand, the drive vehicle and, on the other hand, at least one of the trailer and the semitrailer, the at least one connecting device including at least one of: (a) at least one first detecting arrangement for detecting a first measured quantity of the drive vehicle, and (b) at least one second detecting arrangement for detecting a second measured quantity of the at least one of the trailer and the semitrailer,
- wherein the at least one connecting device includes the at least one second detecting arrangement, and the at least one second detecting arrangement directly measures the second measured quantity of the at least one of the trailer and the semitrailer.

24. The device according to claim 23, wherein the drive vehicle includes a tractor.

25. The device according to claim 23, wherein the at least one connecting device includes at least one of a connecting cable and a connecting line.

26. The device according to claim 23, wherein the at least one connecting device includes a mounting device for mounting on the at least one of the trailer and the semitrailer.

27. The device according to claim 23, wherein the at least one connecting device includes a mounting device for mounting on the drive vehicle.

28. The device according to claim 23, wherein the at least one connecting device remains connected to the drive vehicle when the at least one of the trailer and the semitrailer is unhitched from the drive vehicle.

29. The device according to claim 23, further comprising:
- a CAN bus; and
- a control device situated in the drive vehicle,
- wherein at least one of the first detection arrangement and the second detection arrangement can transmit detected data via the CAN bus to the control device.

30. The device according to claim 23, wherein the at least one connecting device includes a connecting cable through which a lighting system of the at least one of the trailer and the semitrailer is supplied with power from the drive wheel.

31. The device according to claim 23, wherein the at least one connecting device includes an ABS connecting cable through which a control device of the at least one of the trailer and the semitrailer is supplied with a voltage from the drive vehicle.

32. The device according to claim 23, wherein the at least one connecting device includes a connecting cable that connects a control device of the drive vehicle to a control device of the at least one of the trailer and the semitrailer, for providing an exchange of data.

33. The device according to claim 23, wherein the at least one connecting device includes a connecting line through which a braking medium is transported, for at least one of storage and control, into the at least one of the trailer and the semitrailer.

34. The device according to claim 23, further comprising means for determining a quantity describing an angle between the drive vehicle and the at least one of the trailer and the semitrailer as a function of at least one quantity detected for the at least one of the trailer and the semitrailer.

35. The device according to claim 23, wherein the at least one connecting device is not a coupling device for transmitting a drive force between the drive vehicle and at least one of the trailer and semitrailer.

* * * * *